(12) United States Patent
Sussland et al.

(10) Patent No.: US 8,397,083 B1
(45) Date of Patent: Mar. 12, 2013

(54) SYSTEM AND METHOD FOR EFFICIENTLY DELETING A FILE FROM SECURE STORAGE SERVED BY A STORAGE SYSTEM

(75) Inventors: Robert Jan Sussland, San Francisco, CA (US); Lawrence Wen-Hao Chang, San Francisco, CA (US); Ananthan Subramanian, Menlo Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 1361 days.

(21) Appl. No.: 11/508,430

(22) Filed: Aug. 23, 2006

(51) Int. Cl.
*H04L 29/06* (2006.01)
(52) U.S. Cl. ........ 713/193; 713/189; 713/190; 713/191; 713/192; 713/194; 713/160; 713/161; 713/162; 713/163; 713/164; 713/165; 713/166; 713/167; 380/277; 380/278; 380/279; 380/280; 380/282; 380/283; 380/284; 380/285; 380/286; 380/45; 380/281; 726/2; 726/11; 726/12; 726/13; 726/14; 726/15
(58) Field of Classification Search .......... 713/150–154, 713/189–194, 160–167; 707/100–103; 380/277–286, 44–47; 709/246–249
See application file for complete search history.

(56) References Cited

U.S. PATENT DOCUMENTS

| | | | |
|---|---|---|---|
| 1,310,719 A | 7/1919 | Vernam | |
| 4,262,329 A | 4/1981 | Bright et al. | |
| 4,558,176 A | 12/1985 | Arnold et al. | |
| 4,731,840 A | 3/1988 | Mniszewski et al. | |
| 4,757,533 A | 7/1988 | Allen et al. | |
| 5,058,162 A | 10/1991 | Santon et al. | |
| 5,185,717 A | 2/1993 | Mori | |
| 5,235,641 A | 8/1993 | Nozawa | |
| 5,265,159 A | 11/1993 | Kung | |
| 5,375,243 A | 12/1994 | Parzych et al. | |
| 5,495,533 A | 2/1996 | Linehan et al. | |

(Continued)

FOREIGN PATENT DOCUMENTS

EP 1612636 * 1/2006

OTHER PUBLICATIONS

Gilmont, T et. al, An architecture of security management unit for safe hosting of multiple agents, Jan. 25-27, 1999, vol. 3657.*

(Continued)

*Primary Examiner* — Thanhnga B Truong
*Assistant Examiner* — Josnel Jeudy
(74) *Attorney, Agent, or Firm* — Cesari and McKenna, LLP

(57) ABSTRACT

A system and method efficiently deletes a file from secure storage, i.e., a cryptainer, served by a storage system. The cryptainer is configured to store a plurality of files, each of which stores an associated file key within a special metadata portion of the file. Notably, special metadata is created by a security appliance coupled to the storage system and attached to each file to thereby create two portions of the file: the special metadata portion and the main, "file data" portion. The security appliance then stores the file key within the specially-created metadata portion of the file. A cryptainer key is associated with the cryptainer. Each file key is used to encrypt the file data portion within its associated file and the cryptainer key is used to encrypt the part of the special metadata portion of each file. To delete the file from the cryptainer, the file key of the file is deleted and the special metadata portions of all other files stored in the cryptainer are re-keyed using a new cryptainer key. Thereafter, the "old" cryptainer key is deleted.

17 Claims, 7 Drawing Sheets

U.S. PATENT DOCUMENTS

| | | | |
|---|---|---|---|
| 5,677,952 | A | 10/1997 | Blakeley, III et al. |
| 5,686,904 | A * | 11/1997 | Bruwer .......................... 340/5.23 |
| 5,687,237 | A | 11/1997 | Naclerio |
| 5,870,468 | A | 2/1999 | Harrison |
| 5,931,947 | A | 8/1999 | Burns |
| 5,933,498 | A | 8/1999 | Schneck et al. |
| 5,940,507 | A | 8/1999 | Cane |
| 6,073,237 | A | 6/2000 | Ellison |
| 6,134,660 | A | 10/2000 | Boneh et al. |
| 6,199,163 | B1 | 3/2001 | Dumas et al. |
| 6,212,600 | B1 | 4/2001 | Friedman et al. |
| 6,249,866 | B1 | 6/2001 | Brundrett |
| 6,345,101 | B1 | 2/2002 | Shukla |
| 6,356,941 | B1 | 3/2002 | Cohen |
| 6,405,315 | B1 | 6/2002 | Burns et al. |
| 6,414,884 | B1 | 7/2002 | DeFelice et al. |
| 6,507,911 | B1 | 1/2003 | Langford |
| 6,550,011 | B1 | 4/2003 | Sims, III |
| 6,625,734 | B1 | 9/2003 | Marvit et al. |
| 6,711,263 | B1 | 3/2004 | Nordenstram et al. |
| 6,735,693 | B1 | 5/2004 | Hamlin |
| 6,754,827 | B1 | 6/2004 | Cane et al. |
| 6,792,544 | B2 | 9/2004 | Hashem |
| 6,839,437 | B1 | 1/2005 | Crane et al. |
| 6,851,056 | B2 | 2/2005 | Evans |
| 6,857,076 | B1 | 2/2005 | Klein |
| 6,915,435 | B1 | 7/2005 | Merriam |
| 6,993,661 | B1 | 1/2006 | Garfinkel |
| 7,003,674 | B1 | 2/2006 | Hamlin |
| 7,020,779 | B1 | 3/2006 | Sutherland |
| 7,093,127 | B2 | 8/2006 | McNulty et al. |
| 7,096,355 | B1 | 8/2006 | Marvit et al. |
| 7,155,464 | B2 * | 12/2006 | Belov ............................ 707/204 |
| 7,215,771 | B1 | 5/2007 | Hamlin |
| 7,240,197 | B1 | 7/2007 | Yamagami et al. |
| 7,260,724 | B1 | 8/2007 | Dickinson et al. |
| 7,343,381 | B2 * | 3/2008 | Shin ........................... 707/104.1 |
| 7,542,571 | B2 * | 6/2009 | Asadu ........................... 380/277 |
| 7,593,532 | B2 * | 9/2009 | Plotkin et al. ................. 380/284 |
| 2002/0073324 | A1 | 6/2002 | Hsu |
| 2003/0028765 | A1 | 2/2003 | Cromer et al. |
| 2004/0153642 | A1 | 8/2004 | Plotkin et al. |
| 2007/0058801 | A1 | 3/2007 | Plotkin |
| 2007/0174362 | A1 * | 7/2007 | Pham et al. ................... 707/204 |
| 2007/0174634 | A1 | 7/2007 | Plotkin |
| 2008/0028452 | A1 * | 1/2008 | Lee et al. .......................... 726/9 |

OTHER PUBLICATIONS

Anderson et al., "The Steganographic File System," Information Hiding, Second International Workshop, IH '98 Portland, Oregon. USA, Apr. 14-17, 1998, Proceedings, pp. 73-82, 1998.

Antonelli, et al., "The Packet Vault: Secure Storage of Network Data," CITI Technical Report 98-5, pp. 1-15, Jun. 25, 1998.

Blaze, "Oblivious Key Escrow," Information Hiding, First International Workshop, Cambridge, UK, May 3D-Jun. 1, 1996, Proceedings, pp. 335-343, 1996.

Blaze, "A cryptographic File System for Unix," Proceedings of the First ACM Conference on Computer and Communications Security, pp. 9-16 (1993).

Blaze, "Key Management in an Encrypting File System," USENIX Summer 1994 Technical Conference, pp. 27-35, (Jun. 6-10, 1994).

Boneh, et al., "A Revocable Backup System," In Proceedings 6th USENIX Security Conference, pp. 91-96, 1996.

Cattaneo, et al. "The Design and Implementation of a Transparent Cryptographic Filesystem for UNIX," Proceedings of The FREENIX Track: 2001 UNIX Annual Technical Conference. pp. 199-212 (Jun. 25-30, 2001).

Christy, et al., "Mechanism for Secure Off-Site Computer Access," IBM Technical Disclosure Bulletin. pp. 6754-6756. Apr. 1985.

Clark, "Physical Protection of Cryptographic Devices," Lecture Notes in Computer Science. Advances in Cryptology—EUROCRYPT '87, pp. 83-93 (Apr. 13-15, 1987).

Coleman et al., "Mass Storage System Reference Manual: Version 4," Technical Committee on Mass Storage Systems and Technology, IEEE, pp. 1-38, May 1990.

Comba, "Approaches to Cryptographic Key Management," Symposium on Applied Computing. Proceedings of the Northeast ACM Symposium on Personal Computer Security, pp. 38-45 (1986).

Denning, "Cryptography and Data Security," Addison-Wesley Publishing Co., pp. 164-169 and 179, 1982.

Di Crescenzo, et al., "How to Forget a Secret (Extended Abstract)," 16th Annual Symposium on Theoretical Aspects of Computer Science, pp. 500-509 (Mar. 4-6, 1999).

Dietrich, "Security Enclosure With Elastomeric Contact Stripes, " IBM Technical Disclosure Bulletin, pp. 444-445, Feb. 1991.

"Disappearing Inc. Makes Old Email Vanish Everywhere; Reduces Corporate Liability as well as Improves Corporate Productivity by Enabling Sensitive Communications via Email-Company Business and Marketing," Edge: Work-Group Computing Report, http://findarticles.com/p/articJes/mLmOWUB/is_1999_OcU 1/aL 56260487/print (Oct. 11, 1999).

Double, "Encryption Key Security by Electric Field Destruction of Memory Cells," IBM Technical Disclosure Bulletin, pp. 8-11, Jan. 1989.

FIPS PUB 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.

FIPS PUB 140-1, "Security Requirements for Cryptographic Modules," Federal Information Processing Standards Publication 140-1, National Institute of Standards and Technology, Jan. 11, 1994, 44 pages.

Flavin, et al., "Data Protection on Magnetic Media Via an Encrypting Controller," IBM Technical Disclosure Bulletin, vol. 3D, No. 3, pp. 1284-1285 (Aug. 1987).

Garfinkel, S., "PGP: Pretty Good Privacy," O'Reilly & Associates, pp. 54-55, 151-153, 168-169, Jan. 1995.

Garfinkel, S., "Omniva's Self-Destructing Email," Web Security, Privacy and Commerce, Second Edition, O'Reilly & Associates, Inc., Sebastopol, CA, pp. 280-283, Jan. 2002.

Gobioff, Howard, et al., "Security for Networked Attached Storage Devices," Carnegie Mellon University Computer Science Technical Report CMU-CS-97-185, Oct. 1997, 20 pages.

Gobioff, Howard, "Security for a High Performance Commodity Storage Subsystem," Carnegie Mellon University Computer Science Technical Report CMU-CS-99-160, Jul. 1999, 222 pages.

Gobioff, Howard, et al., "Smart Cards in Hostile Environments," Proceedings of the Second USENIX Workshop on Electronic Commerce, pp. 23-28 (Nov. 18-21, 1996).

Graham, et al, "Data Protection at the Volume Level," IBM Technical Disclosure Bulletin, pp. 146-148, Oct. 1988.

Gutmann, "Secure Deletion of Data from Magnetic and Solid-State Memory," Proceedings of the Sixth Annual USENIX Security Symposium: Focusing on Applications of Cryptography, pp. 7-89 (Jul. 22-25, 1996).

Hwang, et al., "An Access Control Scheme Based on Chinese Remainder Theorem and Time Stamp Concept," Computers & Security, vol. 15. No. 1. pp. 73-81,1996.

IBM Crypto Server Management General Information Manual, First Edition (May 2000), 16 pages.

IBM SecureWay Cryptographic Products IBM 4758 PCI Cryptographic Coprocessor Installation Manual, Security Solutions and Technology Department, Second Edition (Mar. 2000), 34 pages.

IBM SecureWay, UltraCypher Cryptographic Engine (Datasheet) (1998), 2 pages.

IBM 4758 PCI Cryptographic Coprocessor Custom Software Installation Manual, Second Edition, Jan. 2001, 30 pages.

Avoid Litigation: Encrypt Your Data, InfoTech Research Group, Sep. 19, 2006, 6 pages.

Johnson et al., "Self-Destructing Diskette," IBM Technical Disclosure Bulletin, vol. 33, No. 1A, pp. 218-219 (Jun. 1990).

Mallett, "Considerations for Applying Disk Encryptors 10 Environments Subject to Hostile Overrun," IEEE, pp. 218-222, 1991.

Mauriello, "TCFS: Transparent Cryptographic File system," LINUX Journal, Aug. 1,1997, 8 pages.

Moore, "Preventing Access to a Personal Computer," IBM Technical Disclosure Bulletin, pp. 98-100, Sep. 1992.

Omniva Policy Systems, www.omniva.com (Aug. 2004), downloaded from web.archive.org on Aug. 24, 2004, 19 pages.

Provos, Niels, "Encrypting Virtual Memory," CITI Technical Report 00-3, Center for Information Technology Integration, University of Michigan, Apr. 25, 2000, 11 pages.

Scherzer. "Memory Protection in Chip Cards," IBM Technical Disclosure Bulletin, pp. 416-417, Oct. 1989.

Slusarczuk et al., "Emergency Destruction of Information Storage Media," Institute for Defense Analysis, IDA Report R-321, Dec. 1987, 196 pages.

Smith, "Verifying Type and Configuration of an IBM 4758 Device: A While Paper," IBM T.J. Watson Research Center pp. 1-7 (218/00).

Smith et al., "IBM Research Report: Building a High-Performance, Programmable Secure Coprocessor," IBM Research Division, Computer Science/Mathematics, RC 21102(94393) (Feb. 19, 1998), 61 pages.

Stinson, Douglas R., "Cryptography: Theory and Practice," CRC Press, Mar. 1, 1995, 228 pages.

Vernam, "Cipher Printing Telegraph Systems for Secret Wire and Radio Telegraphic Communications," Journal of the AI EE. pages 109-115, Feb. 1926.

Weingart, "Physical Security for the uABYSS System," Proceedings 1987 IEEE Symposium on Security and Privacy, pp. 2-58 (Apr. 27-29, 1987), pp. 52-58.

Whitten et al., "Usability of Security: A Case Study," CMU Computer Science Technical Report CMU-CS-98-155. pp. 1-39, Dec. 18, 1998.

Yee et al., "Secure Coprocessors in Electronic Commerce Applications," Proceedings of the First USENIX Workshop of Electronic Commerce, pp. 155-170, Jul. 11-12, 1995.

Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).

Zadok et al., "Cryptfs: A Stackable Vnode Level Encryption File System," Computer Science Department, Columbia University, CUCS-021-98, pp. 1-14, Jun. 1998.

Garfinkel, S., "PGP: Pretty Good Privacy," O'Reilly & Associates, pp. 43 and 65-67, Jan. 1995.

Garfinkel, S., "PGP: Pretty Good Privacy," O'Reilly & Associates, pp. 54-55, 151-153, Jan. 1995.

Menezes et al., "Handbook of Applied Cryptography," CRC Press, Section 13.7.1, 4 pages, 1997.

Schneier, "Applied Cryptography Second Edition: Protocols, Algorithms, and Source Code in C," John Wiley & Sons, Inc. pp. 5, 15, 179-181, 185, 213-214, 225, 229, 563-566 and 569. 1996.

Itoi, "SC-CFS: Smartcard Secured Cryptographic File System," CITI Technical Report 01-6, Center for Information Technology Integration, University of Michigan, Jan. 16, 2001, 11 pages.

IBM Integrated Cryptographic Coprocessors for IBM eServer zSeries 900 and for IBM S/390 Servers (Data sheet), 2000, 4 pages.

* cited by examiner

SYSTEM AND METHOD FOR EFFICIENTLY DELETING A FILE FROM SECURE STORAGE SERVED BY A STORAGE SYSTEM

CROSS-REFERENCE TO RELATED APPLICATION

The present invention is related to the following commonly assigned U.S. patent application Ser. No. 10/478,386 titled, Encryption Based Security System for Network Storage, filed May 14, 2003, which application is hereby incorporated by reference.

FIELD OF THE INVENTION

The present invention relates to secure storage in a storage system, and more specifically, to deletion of a data container, such as a file, from secure storage served by a storage system.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the net-identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored data using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

SCSI is a peripheral input/output (I/O) interface with a standard, device independent protocol that allows different peripheral devices, such as disks, to attach to a storage system. In SCSI terminology, clients operating in a SAN environment are "initiators" that initiate commands and requests to access data. The storage system is thus a "target" configured to respond to the data access requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

A SAN arrangement or deployment allows decoupling of storage from the storage system, such as an application server, and some level of information storage sharing at the storage system level. There are, however, environments wherein a SAN is dedicated to a single storage system. In some SAN deployments, the information is organized in the form of databases, while in others a file-based organization is employed. Where the information is organized as files, the client requesting the information maintains file mappings and manages file semantics, while its requests (and storage system responses) address the information in terms of block addressing on disk using, e.g., a logical unit number (lun).

A network environment may be provided wherein information (data) is stored in secure storage served by one or more storage systems coupled to one or more security appliances. Each security appliance is configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun. In the context of a NAS environment, the cryptainer may be a collection of files on one or more disks. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

Assume that a cryptainer contains a plurality of files and that the cryptainer is mirrored or replicated in a plurality of geographically-dispersed locations. In addition, assume a client wants to delete (destroy) a file from all cryptainer replicas. One approach to deleting a file stored on one or more cryptainers is to delete the cryptainer key used to encrypt data for the entire cryptainer. However, a customer may desire to delete information at a finer granularity than a cryptainer. This approach is clearly problematic if the client intends to maintain certain files within the cryptainer. A solution to this problem is to encrypt each file with its own encryption key (i.e., a file key) and store the file key for every file on, e.g., the security appliance. However, since there may be a substantial number of files contained in the cryptainer, this solution may necessitate the use of a file system to manage all of the file keys. Implementation of a file system on the security appliance may be difficult given, e.g., memory constraints that limit the capabilities of the appliance.

SUMMARY OF THE INVENTION

The disadvantages of the prior art are overcome by providing a system and method for efficiently deleting a file from secure storage, i.e., a cryptainer, served by a storage system. The cryptainer is configured to store a plurality of files, each of which stores an associated file key within a special metadata portion of the file. Notably, special metadata is created by a security appliance coupled to the storage system and attached to each file to thereby create two portions of the file: the special metadata portion and the main, "file data" portion. The security appliance then stores the file key within the specially-created metadata portion of the file. A cryptainer key is associated with the cryptainer; however, the cryptainer key is not used to encrypt all portions of the files, including the file data portions, stored on the cryptainer. Instead, according to an aspect of the invention, each file key is used to encrypt the file data portion of its associated file and the cryptainer key is only used to encrypt part of the special metadata portion of each file including the file key. As a result, each file key of each file is encrypted and signed with the cryptainer key.

In accordance with another aspect of the invention, a file crypto-shredding procedure is then used to cryptographically delete the file from the cryptainer. According to this procedure, the file key of the file is deleted and the parts of the special metadata portions of all other files stored in the cryptainer are re-keyed using a new cryptainer key. It should be noted that re-keying, in this context, denotes generating a new cryptainer key, decrypting the encrypted metadata portions with the "old" cryptainer key, and encrypting the decrypted metadata portions of the files with the new cryptainer key. Thereafter, the old cryptainer key is deleted to thereby efficiently delete the file from the cryptainer.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
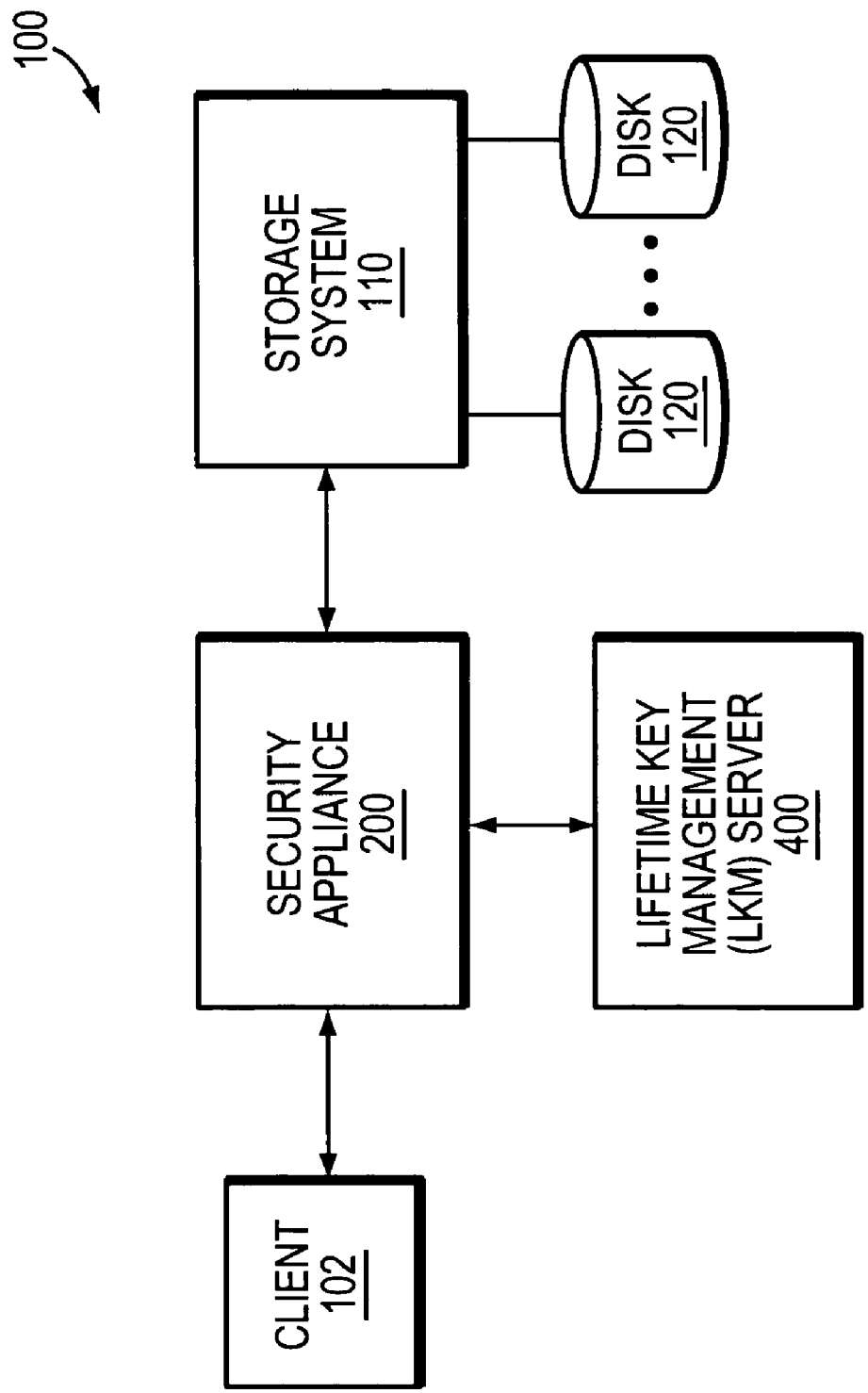
FIG. 1 is a schematic block diagram of an environment including a multi-protocol security appliance that may be advantageously used with the present invention.

FIG. 1 is a schematic block diagram of an environment 100 including a multi-protocol security appliance 200 that may be advantageously used with the present invention. The security appliance 200 is coupled between one or more clients 102 and one or more storage systems 110, such as an application server or filer. The security appliance 200 intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in encrypted form. The security appliance 200 then decrypts the encrypted data and returns the decrypted data to the client 102.

In the illustrative embodiment, the security appliance employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security appliance illustratively uses a high-quality, software or hardware-based pseudo random number generation technique to generate encryption keys. The encryption and decryption operations are performed using these encryptions keys, such as a cryptainer key associated with each cryptainer. As described herein, the security appliance 200 uses an appropriate cryptainer key to encrypt or decrypt portions of data stored in a particular cryptainer. In addition to performing encryption and decryption operations, the security appliance 200 also performs access control, authentication, virtualization, and secure-logging operations.

A lifetime key management (LKM) server 400 is configured to manage all encryption keys used by the security appliance 200 to encrypt and decrypt data securely stored on the storage system 110, ensuring encryption key availability for the life of the secured data. For example, the LKM server 500 receives encrypted cryptainer keys from the security appliance 200 and sends encrypted cryptainer keys on demand to the appliance. The LKM server is further configured to support a plurality of security appliances 200 such that, when a particular appliance encounters a data access request directed to a cryptainer for which it does not have the appropriate key, that appliance accesses the LKM server 500 to receive the appropriate key.

Figure 2:
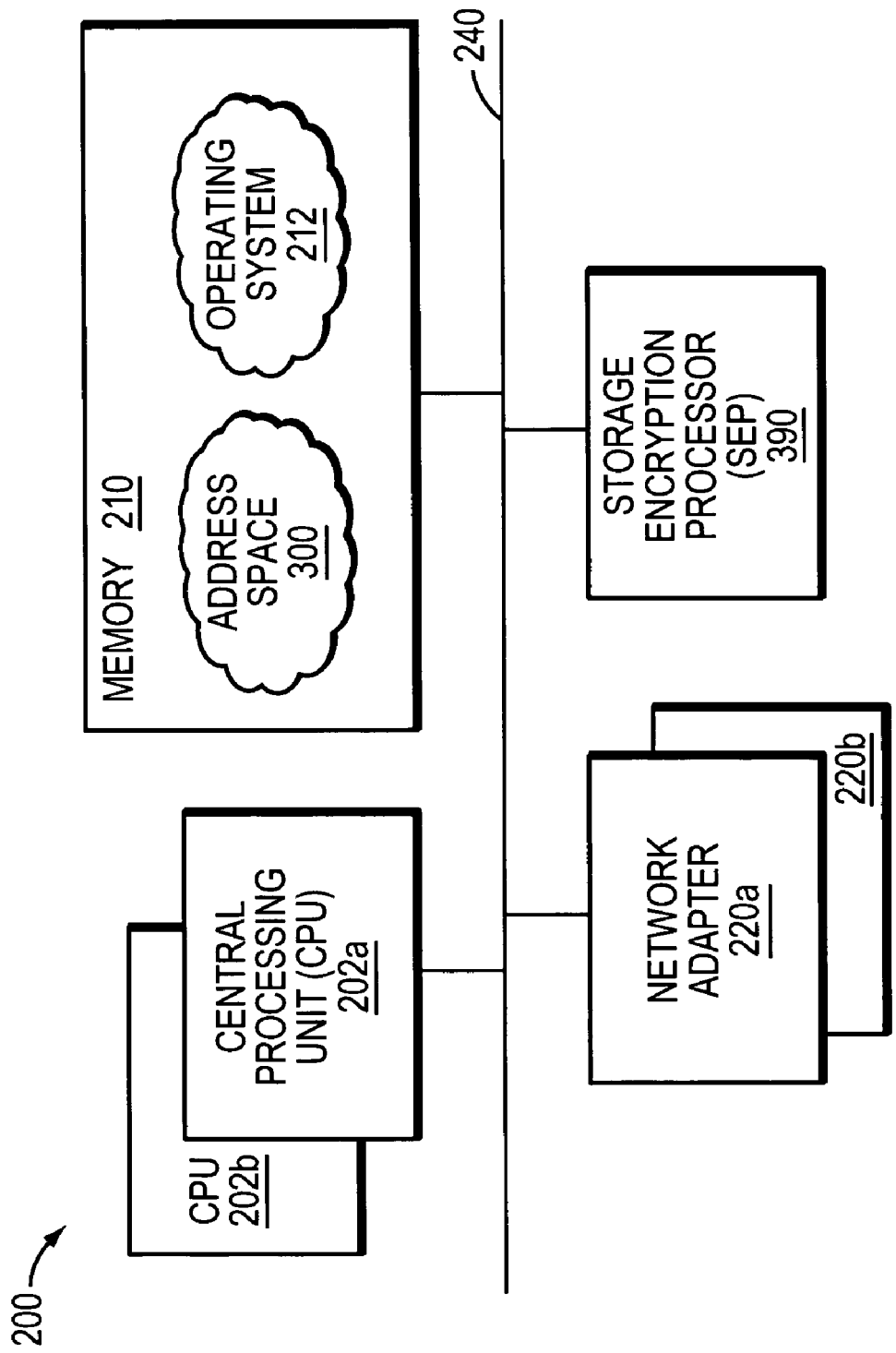
FIG. 2 is a schematic block diagram of the multi-protocol security appliance that may be advantageously used with the present invention.

FIG. 2 is a schematic block diagram of the multi-protocol security appliance 200 that may be advantageously used with the present invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 220a,b), a memory 210, one or more network adapters 220a,b, and a storage encryption processor (SEP 390) interconnected by a system bus 240, such as a conventional Peripheral Component Interconnect (PCI) bus. The SEP 390 is configured to perform all encryption and decryption operations for the security appliance in a secure manner; for example, the SEP is configured to protect plaintext encryption keys from system software executing on each CPU 202. Accordingly, the SEP is illustratively embodied as a FIPS 140-2 level-3 certified module that is epoxy-potted onto a dedicated interface card or other similar card.

The network adapters 220 couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

Figure 3:
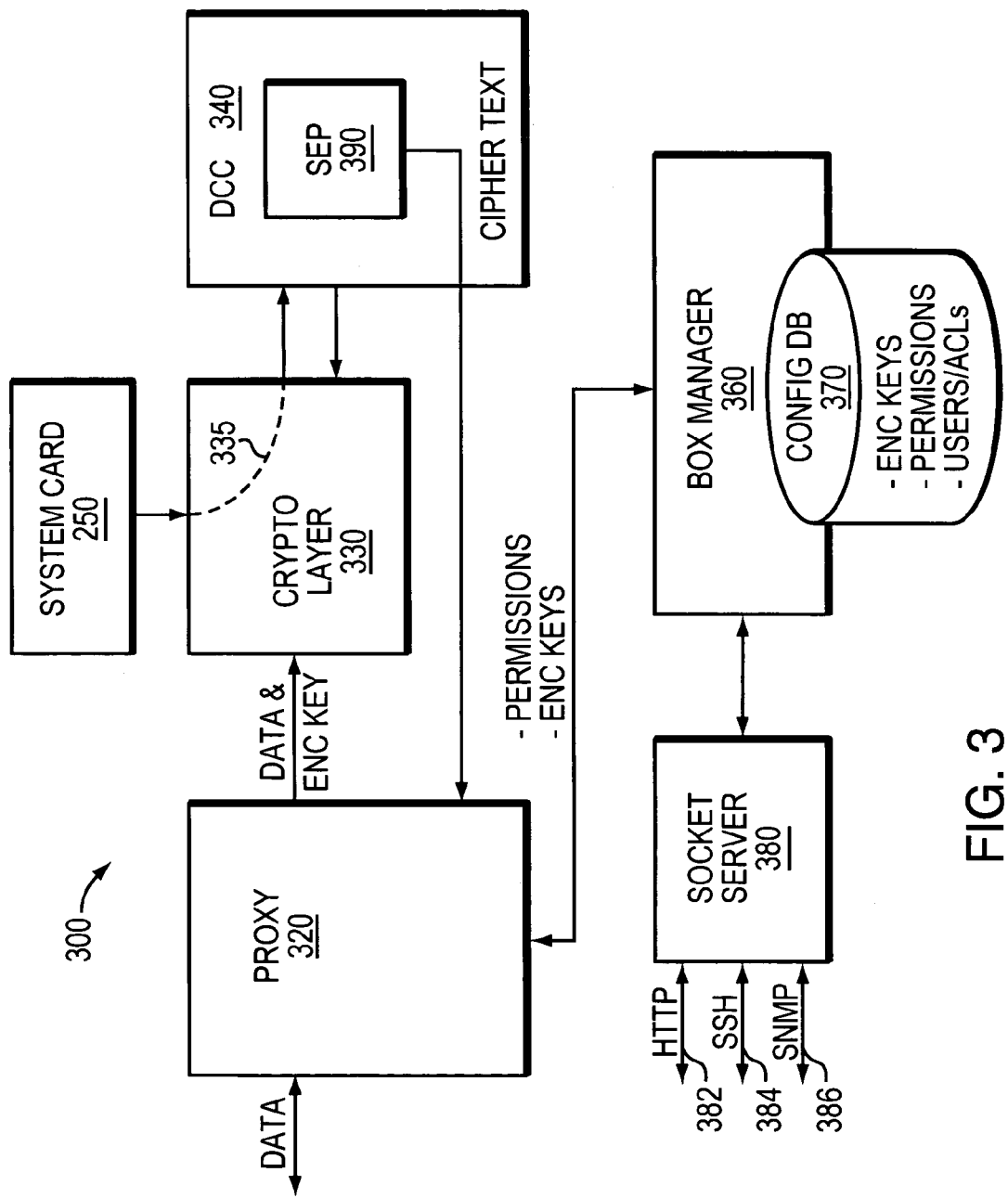
FIG. 3 is a schematic diagram illustrating an arrangement of software processes and modules executing on the security appliance in accordance with the present invention.

The operating system 212 illustratively organizes the memory 210 into an address is space arrangement available to the software processes and modules executing on the processors. FIG. 3 is a schematic diagram illustrating an arrangement 300 of software processes and modules executing on the security appliance 200 in accordance with the present invention. In the illustrative embodiment, the operating system software is a customized version of a Unix type operating system, although other operating systems may be used.

For both NAS and SAN environments, data is received at a proxy 320 of the security appliance. The proxy 320 is a module embodied as, e.g., the network protocol stack configured to interpret the protocol over which data is received and to enforce certain access control rules based on one or more policies. Each policy is served by a box manager 360. The box manager 360 is illustratively embodied as a database application process configured to manage a configuration repository or database (Config DB 370) that stores system-wide settings and encrypted keys. A socket server 380 provides interfaces to the box manager 360, including (i) an HTTP web interface 382 embodied as, e.g., a graphical user interface (GUI) adapted for web-based administration, (ii) a SSH interface 384 for command line interface (CLI) command administration, and (iii) an SNMP interface 386 for remote management and monitoring.

Specifically, the box manager 360 supplies the permissions and encrypted keys to the proxy 320, which intercepts data access requests and identifies the sources (clients 102) of those requests, as well as the types of requests and the storage targets (cryptainers) of those requests. The proxy also queries the box manager for permissions associated with each client and, in response, the box manager 360 supplies the appropriate permissions and encrypted key (e.g., a cryptainer key). The proxy 320 then bundles the data together with the encrypted key and forwards that information to a crypto process (layer) 330 that functions as a "wrapper" for the SEP 390. As noted, the SEP resides on an interface card, which is hereinafter referred to a data crypto card (DCC 340).

The crypto layer 330 interacts with the DCC 340 by accessing (reading and writing) registers on the DCC and, to that end, functions as a system bus interface. Illustratively, a descriptor queue is used by the crypto layer to access the DCC by, e.g., supplying starting and ending points of data, as well as offsets into the data and the encrypted keys used to encrypt the data. The DCC 340 includes one or more previously loaded keys used to decrypt the supplied encrypted keys; upon decrypting an encrypted key, the DCC uses the decrypted key to encrypt the supplied data. Upon completion of encryption of the data, the DCC returns the encrypted data as ciphertext to the proxy 320, which forwards the encrypted data to the storage system 110.

Notably, the security appliance 200 "virtualizes" storage such that, to a client 102, the appliance appears as a storage system 110 whereas, from the perspective of the storage system, the security appliance appears as a client. Such virtualization requires that security appliance manipulate (IP) addresses with respect to data access requests and responses. Illustratively, certain customizations to the network protocol stack of the proxy 320 involve virtualization optimizations provided by the appliance. For example, the security appliance 200 manipulates (changes) the source and destination IP addresses of the data access requests and responses.

In the illustrative embodiment, the encrypted key, e.g., a cryptainer key, exchanged between the proxy 320, box manager 360 and crypto layer 330 is encrypted by a domain key. In addition, the previously loaded key used by the DCC 340 (or, more specifically, the SEP 390) to decrypt the encrypted cryptainer key. The SEP 390 illustratively implements the AES-256 encryption algorithm. However, it should be noted that in alternate embodiments, the SEP 390 may implement additional and/or differing encryption algorithms including, e.g., HMAC-SHA-512, deterministic random number generator (DRNG) using SHA-1, elliptic curve cryptography, etc.

Figure 4:
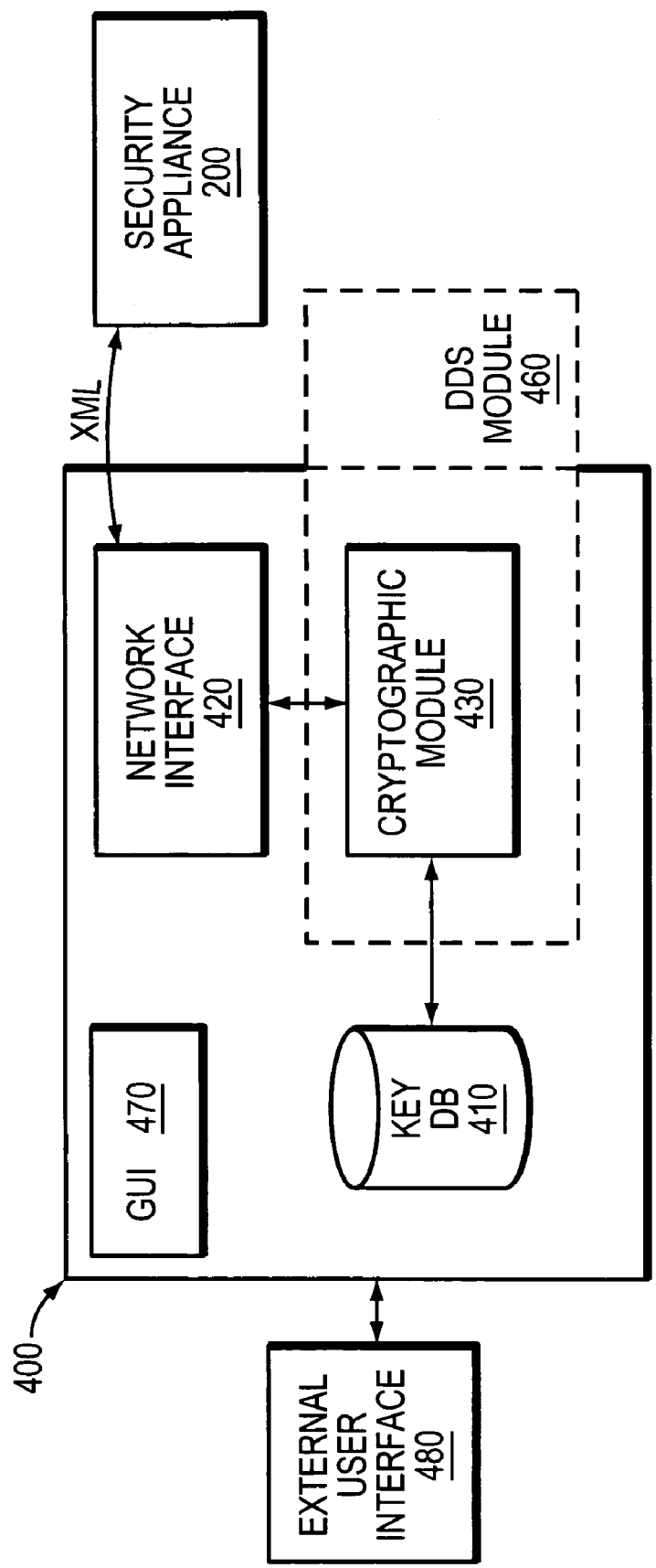
FIG. 4 is a schematic block diagram of a lifetime key management (LKM) server that may be advantageously used with the present invention.

FIG. 4 is a schematic block diagram of the LKM server 400 that may be advantageously used with the present invention. The LKM server is illustratively embodied as software running on a host machine, such as a computer executing, e.g., the conventional Windows operating system. However, it will be understood to those of skill in the art that the LKM server could also be embodied as hardware. The LKM 400 includes a key database 410, which is illustratively a relational database (e.g., a conventional SQL database) or other database configured to store keys. A network interface 420 provides connections to all security appliances 200 that utilize the LKM server. The LKM 400 illustratively communicates with the security appliance 200 via a proprietary protocol, preferably based on XML. A cryptographic module 430 is configured to implement algorithms needed to perform cryptographic operations for the LKM.

An overlapping, data decryption software (DDS) module 460 "shares" the cryptographic module (e.g., its algorithms) on the LKM server. Illustratively, the function of the DDS 460 is to decrypt a piece of storage (e.g., a file) with an appropriate key to thereby enable recovery of the data contained in the file. To that end, the DDS functions as a data recovery software module. The LKM server 400 also includes a GUI 470 that provides a user with an interface to the functionality of the LKM and DDS 460. Alternatively, an external user interface 480 may run on a stand alone machine, such as a Windows management station, to provide GUI functionality for the LKM.

In the illustrative embodiment, the LKM 400 is embodied as an independent server that is coupled to one or more security appliances 200. When initializing a security appliance, a system administrator specifies the LKM 400 with which the appliance is to communicate. In addition, a trust relationship is established between the security appliance and the LKM using, e.g., a shared secret or certificate to establish a secure communication channel. Note that storage of the key on the key database 410 is primarily for redundancy/backup of the key to thereby reduce the chances of data loss for information protected by the key. In the case of a security appliance cluster, a key created in one appliance is replicated and stored on the other clustered appliances. Furthermore, an expiration date (time) is associated with each key. When the expiration time is met, each entity (e.g., a security appliance and/or the LKM) that has a key will delete (destroy) that key on its own. Each key may have attributes that specify that, e.g., even though the key has yet to expire, it can no longer be used to write data (but only read data).

The present invention is directed to a system and method for efficiently deleting a file from secure storage, i.e., a cryptainer, served by a storage system. The cryptainer is configured to store a plurality of files, each of which stores an associated file key within a special metadata portion of the file. Notably, special metadata is created by a security appliance coupled to the storage system and attached, e.g., prepended or postpending, to each file to thereby create two portions of the file: the special metadata portion and the main, "file data" portion. The security appliance then stores the file key within the specially-created metadata portion of the file. A cryptainer key is associated with the cryptainer; however, the cryptainer key is not used to encrypt all portions of the files, including the file data portions, stored on the cryptainer. Instead, according to an aspect of the invention, each file key is used to encrypt the file data portion of its associated file and the cryptainer key is only used to encrypt part of the special metadata portion of each file including the file key. That is, the cryptainer key is used to encrypt all of the special metadata except a file key package described in FIG. 6. As a result, each file key of each file is encrypted and signed with the cryptainer key.

One way to delete an encrypted file, including its file data, is to destroy the key(s) needed to decrypt the file. That is, instead of having to individually destroy files on the disks (including any mirrors and backup disks), the file can be destroyed by deleting the encryption key(s) used to encrypt the file. Deletion of a key is preferably performed in a secure manner by, e.g., overwriting the key with a predetermined pattern of ones or zeros, or with random numbers. Note that deletion of a cryptainer key stored on the LKM server is efficient because the entire key database 410 on the LKM server 400 is relatively small (e.g. one megabyte in size). In addition, the LKM server is configured to store only the most recent copies of keys for the cryptainers.

In accordance with another aspect of the invention, a file crypto-shredding procedure is then used to cryptographically delete the file from the cryptainer. According to this procedure, the file key of the file is deleted and the parts of the special metadata portions of all other files stored in the cryptainer are re-keyed using a new cryptainer key. It should be noted that re-keying, in this context, denotes generating a new cryptainer key, decrypting the encrypted metadata portions with the "old" cryptainer key, and encrypting the decrypted metadata portions of the files with the new cryptainer key. Thereafter, the old cryptainer key is deleted to thereby efficiently delete the file from the cryptainer.

Figure 5:
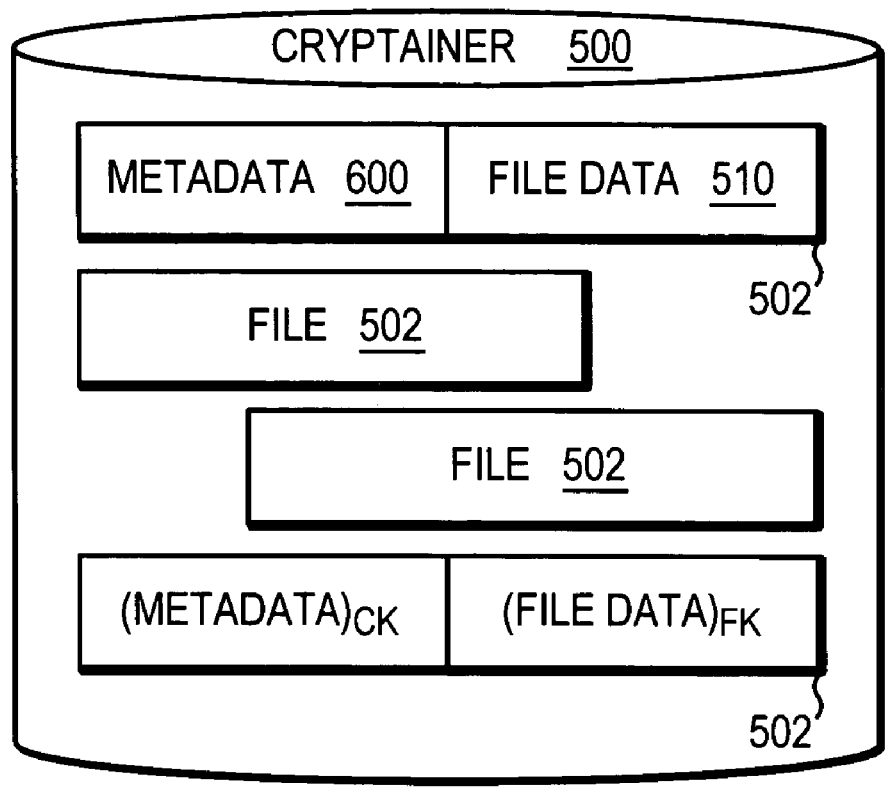
FIG. 5 is a schematic block diagram illustrating a cryptainer that may be advantageously used with the present invention.

FIG. 5 is a schematic block diagram illustrating a cryptainer 500 that may be advantageously used with the present invention. A system administrator illustratively designates one or more regions of storage on the disks 120 as one or more cryptainers 500. In the illustrative embodiment described herein, the cryptainer 500 is configured to store a plurality of files 502, each of which stores an associated encryption key, i.e., a file key (FK), within a special metadata portion 600 of the file. The cryptainer 500 also has an associated encryption key, i.e., a cryptainer key (CK), that illustratively contains an encryption section ($CK_E$) and an HMAC signature section ($CK_{HMAC}$).

According to the invention, instead of using the cryptainer key CK to encrypt all data within the cryptainer 500, the file key FK is used to encrypt the file data portion 510 within a file 502. Notably, the cryptainer key CK is used to only encrypt part of the special metadata, including the file key, within a metadata portion 600 of each file 502. That is, each file key FK is encrypted and signed with the cryptainer key CK of the cryptainer. Note that, in the illustrative embodiment, the encrypted metadata portion 600 is prepended to each file (e.g., the first 512 bytes of each file), although the portion 600 may also be appended or otherwise attached to the file.

Figure 6:
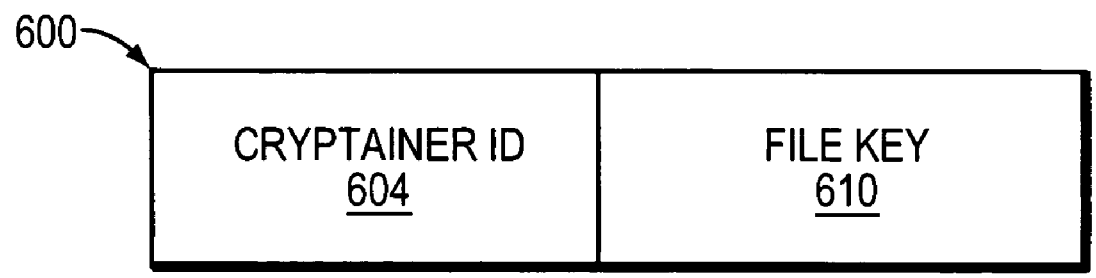
FIG. 6 is a schematic block diagram illustrating a special metadata portion of a file that is encrypted on the cryptainer in accordance with the present invention.

FIG. 6 is a schematic block diagram illustrating the special metadata portion 600 of a file that is encrypted on the cryptainer 500 in accordance with the present invention. A cryptainer identifier (ID) field 704 contains the ID of the cryptainer key CK and a file key field 710 contains the file key FK. Specifically, the file key FK is encrypted and signed with an ID (the cryptainer key) to thereby form a file key package.

Figure 7:
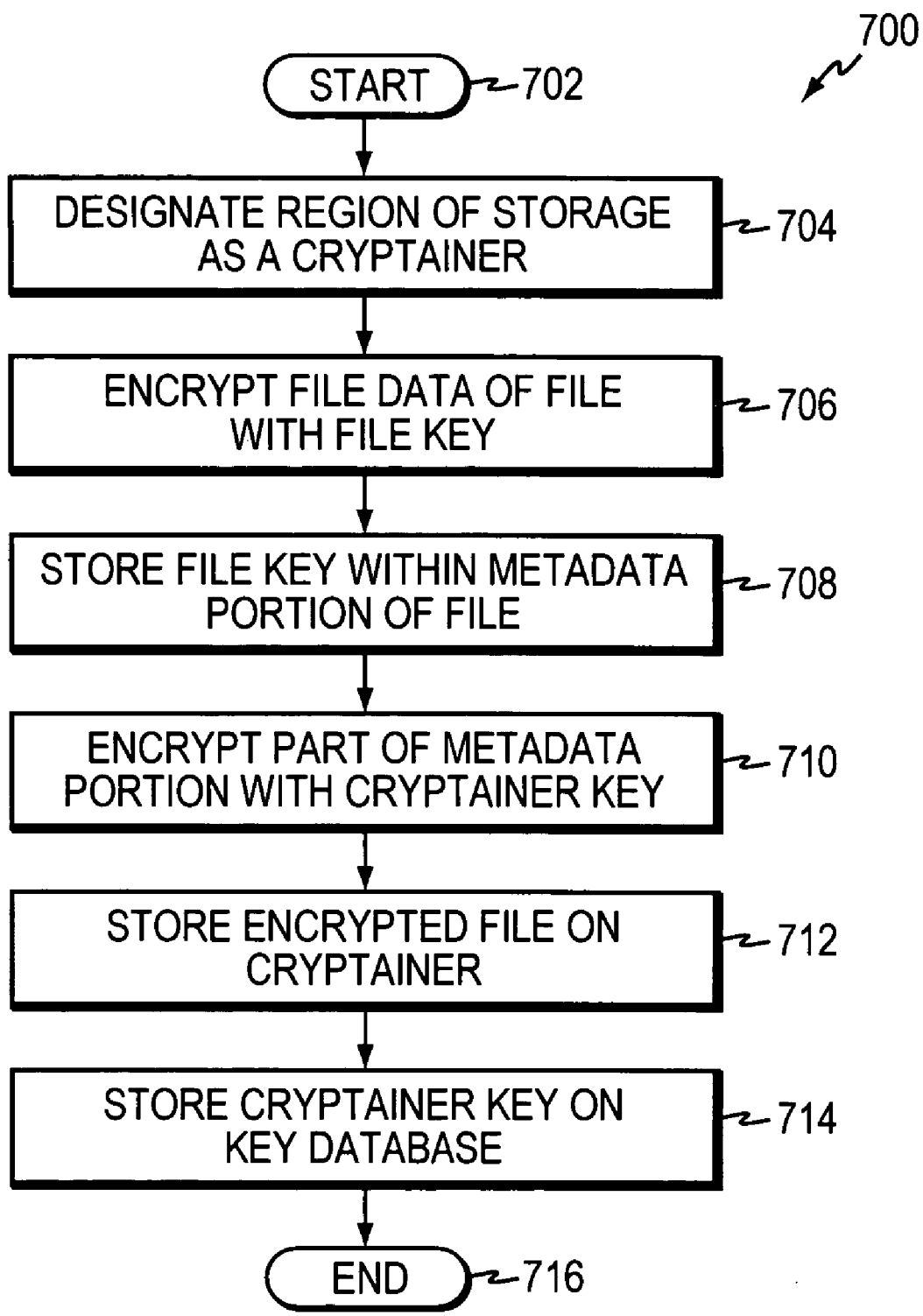
FIG. 7 is a flowchart illustrating a procedure used to encrypt the file for secure storage on the cryptainer in accordance with the present invention.

FIG. 7 is a flowchart illustrating a procedure 700 used to encrypt a file for secure storage on a cryptainer in accordance with the present invention. The procedure 700 starts in Step 702 and proceeds to Step 704 where a system administrator designates a region of storage on disks 120 of the storage system 110 as a cryptainer 500 configured to store a plurality of files 502. In Step 706, the security appliance encrypts the file data 510 of each file 502 using a file key FK associated with file. In Step 708, the security appliance stores the file key FK within a metadata portion 700 of each file and, in Step 710, encrypts part of the metadata portion of each file using a cryptainer key associated with the cryptainer. The security appliance then forwards each encrypted file to the storage system 110 for storage on the cryptainer 500 (Step 712) and forwards the (encrypted) cryptainer key to the LKM server 400 for storage on the key database 410 (Step 714). The procedure then ends at Step 716.

Figure 8:
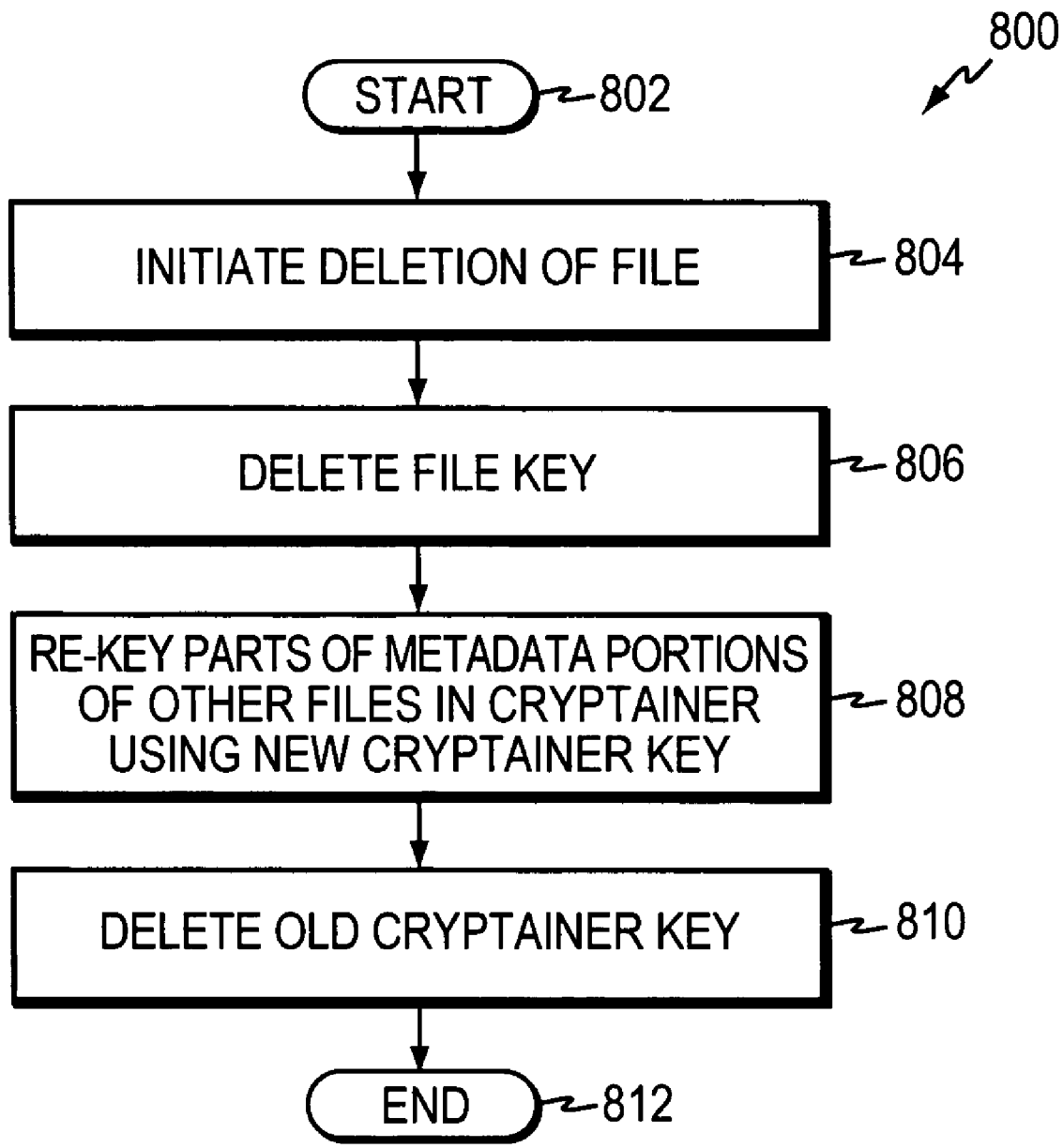
FIG. 8 is a flowchart illustrating a file crypto-shredding procedure in accordance with the present invention.

FIG. 8 is a flowchart illustrating the file crypto-shredding procedure 800 in accordance with the present invention. The procedure 800 starts at Step 802 and proceeds to Step 804 where a user initiates deletion of a specified file 502, e.g., at a CLI or GUI of the security appliance 200. In response, the security appliance 200 deletes the file key FK of the file in Step 806. In Step 808, the security appliance re-keys the parts of the metadata portions 600 of the other files in the cryptainer 500 using the new cryptainer key. In Step 810, the security appliance and LKM server 400 cooperate to delete the old cryptainer key CK; note that, in this step, the LKM server deletes the old cryptainer key CK from the key database 410. In the illustrative embodiment, file keys are not backed up on the key database 410 and thus, only cryptainer keys can be deleted at the LKM server 400. Note also that the security appliance 200 may perform the re-keying operation in accordance with a background process. The procedure then ends at Step 812.

While there has been shown and described an illustrative embodiment of a system and method for efficiently deleting a file from secure storage, i.e., a cryptainer, served by a storage system, it is to be understood that various other adaptations and modifications may be made within the spirit and scope of the invention. For example, although the illustrative embodiment describes deletion of a file, i.e., a data container, from the cryptainer, the present invention may equally be applied to deletion of any type of data container from the cryptainer, wherein the data container is embodied as a subset of the cryptainer. That is, the invention may apply to deletion of a chunk of data within the cryptainer.

The foregoing description has been directed to specific embodiments of this invention. It will be apparent, however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for efficiently deleting a data container from a cryptainer configured to store a plurality of data containers served by a storage system having a processor, the method comprising:
    designating a region of storage space of the storage system as the cryptainer configured to store the plurality of data containers;
    storing, by a security appliance, a data container encryption key associated with each data container of the plurality of data containers within a metadata portion of each data container, wherein the data container includes the metadata portion and a data portion;
    encrypting, by the security appliance, the data portion of each data container with the associated data container encryption key stored within the metadata portion of each data container of the plurality of data containers;
    encrypting, by the security appliance, each data container encryption key stored within the metadata portion of each data container with a first secure storage key, stored in a lifetime key management server, associated with the cryptainer that stores the plurality of data containers;
    initiating deletion of a specified data container of the plurality of data containers stored on the cryptainer;
    deleting, by the security appliance, a first data container encryption key associated with the specified data container;
    re-keying, by the security appliance, each metadata portion of all other data containers stored in the cryptainer using a second secure storage key associated with the cryptainer; and
    deleting, by the security appliance and lifetime key management server, the first secure storage key to thereby delete the specified data container from the cryptainer.

2. The method of claim 1 wherein re-keying comprises:
    generating the second secure storage key;
    decrypting each of the encrypted metadata portions of all other data containers with the first secure storage key; and
    encrypting each of the decrypted metadata portions of the all other data containers with the second secure storage key.

3. The method of claim 2 wherein the first secure storage key and the second secure storage key are cryptainer keys, and wherein the data container is a file and the data container encryption key is a file key.

4. The method of claim 3 wherein encrypting the metadata portion of each file comprises encrypting all of the metadata portion except a file key package.

5. A system configured to efficiently delete a data container from a cryptainer configured to store a plurality of data containers served by a storage system having a processor, the system comprising:
    a key management server configured to manage keys used to encrypt and decrypt data stored on the cryptainer of a region of storage space configured to store a plurality of data containers, the key management server having a key database configured to store a first secure storage key associated with the cryptainer; and
    a security appliance coupled to the key management server and the storage system, the security appliance configured to store a data container encryption key associated with each data container of the plurality of data containers within a metadata portion of each data container, encrypt a data portion of each data container with the associated data container encryption key stored in the metadata portion, and encrypt the metadata portion of each data container using the first secure storage key, the security appliance further configured to delete a first data container encryption key associated with a specified data container, re-key the metadata portion of all other data containers stored within the cryptainer using a second secure storage key associated with the cryptainer, and cooperate with the key management server to delete the first secure storage key to thereby delete the specified data container from the cryptainer.

6. The system of claim 5 wherein each data container encryption key comprises a number which, when taken together with an encryption algorithm, defines a unique transformation used to encrypt or decrypt data.

7. The system of claim 5 wherein the first secure storage key and the second secure storage key are cryptainer key.

8. The system of claim 7 wherein each cryptainer key contains an encryption section and a signature section.

9. The system of claim 7 wherein the metadata portion of each data container includes a cryptainer identifier field and a file key field.

10. The system of claim 9 wherein the cryptainer identifier field and the file key field together form a file key package.

11. The system of claim 9 wherein the cryptainer identifier field contains an identifier of the cryptainer key.

12. The system of claim 9 wherein the file key field contains a specific encryption key.

13. The system of claim 12 wherein the data container encryption key is encrypted and signed with its own identifier to form an encrypted file key package.

14. The system of claim 13 wherein the encrypted file key package comprises a format field followed by an identifier field that includes an identifier, as well as policy and key type information.

15. The system of claim 14 wherein the encrypted file key package further comprises an encrypted file key and a signature.

16. A non-transitory computer readable medium containing executable program instructions executed by a processor, comprising:
   program instructions that designate a region of storage space of a storage system as a cryptainer to store a plurality of data container;
   program instructions that store a data container encryption key associated with each data container of a plurality of data containers within a metadata portion of each data container, wherein the data container includes the metadata portion and a data portion;
   program instructions that encrypt the data portion of each data container with the associated data container encryption key stored within the metadata portion of each data container;
   program instructions that encrypt each data container encryption key stored within the metadata portion of each data container with a first secure storage key, stored in a lifetime key management server, associated with the cryptainer that stores the plurality of data containers;
   program instructions that initiate deletion of a specified data container of the plurality of data containers stored on the cryptainer;
   program instructions that delete a first data container encryption key associated with a specified data container;
   program instructions that re-key each metadata portion of all other data containers stored within the cryptainer using a second secure storage key associated with the cryptainer; and
   program instructions that delete the first secure storage key to thereby delete the specified data container from within the cryptainer.

17. The non-transitory computer readable medium of claim 16 wherein the program instructions that re-key comprise program instructions that:
   generate the second secure storage key;
   decrypt each of the encrypted metadata portions of all other data containers with the first secure storage key; and
   encrypt each of the decrypted metadata portions of all other data containers with the second secure storage key.

\* \* \* \* \*

UNITED STATES PATENT AND TRADEMARK OFFICE
CERTIFICATE OF CORRECTION

PATENT NO. : 8,397,083 B1
APPLICATION NO. : 11/508430
DATED : March 12, 2013
INVENTOR(S) : Robert J. Sussland et al.

Page 1 of 1

It is certified that error appears in the above-identified patent and that said Letters Patent is hereby corrected as shown below:

In the Specifications

In col. 1, line 57 should read:
packets) to the file system over the network net identifying one or In col. 5, line 50 should read:
memory 210 into an address is space arrangement available to In the Claims In col. 10, line 56 should read:
key and the second secure storage key are cryptainer keys.

Signed and Sealed this
Eleventh Day of June, 2013

Teresa Stanek Rea
*Acting Director of the United States Patent and Trademark Office*